United States Patent Office 3,107,247
Patented Oct. 15, 1963

3,107,247
QUATERNARY COERAMIDONINES
Josef Singer, Leverkusen-Bayerwerk, Germany, assignor to Farbenfabriken Bayer Aktiengesellschaft, Leverkusen, Germany, a corporation of Germany
No Drawing. Filed July 22, 1959, Ser. No. 828,711
Claims priority, application Germany Dec. 16, 1955
3 Claims. (Cl. 260—274)

This invention relates to coeramidonines and more particularly to mono-quaternary salts of coeramidonines.

It is known that coeramidonines can be obtained from 1-arylido- or 1,4- or 1,5-diarylido-anthraquinones by ring closure, for example with the aid of sulfuric acid (see J. Houben, "Das Anthracen und die Anthrachinone," Leipzig, 1929, p. 659 seq.). If 1-anilido-anthraquinone is used as starting materials the reaction can be illustrated by the following formula:

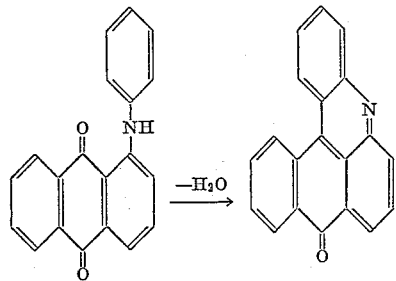

If these coeramidonines which are obtained from 1-arylido-anthraquinones are quaternized in the usual manner with dimethylsulfate there are obtained quaternizing products which differ only very slightly in their colour from the non-quaternized compounds.

The quaternized coeramidonines thus obtained are products which draw on a few fibre material but which show a very unsatisfactory light fastness. The same holds true for the corresponding compounds which are substituted in the 4-position of the anthraquinone, for example by hydroxy, amino or alkylamino groups.

Now it has been found that valuable dyestuffs are obtained if coeramidonines which are obtained by cyclisation of 1,4-diarylido-anthraquinones are quaternized with dimethylsulfate.

The coeramidonines used for the quaternisation can be substituted in the aryl radical, for example by lower alkyl (containing up to 4 C-atoms), or chlorine radicals. Substituents in the anthraquinone radical may be hydroxy or chlorine radicals.

The coeramidonines can be obtained from the 1,4-diarylido-anthraquinones by the procedure known for the formation of coeramidonines, for example by treating one part by weight of the 1,4-diarylido-anthraquinone with about 20 parts by weight of 70–80% sulfuric acid at temperatures between 110–150° C. If 1,4-diarylido-anthraquinones are used, only one mole of water is split off. This indicates that only one ring closure has taken place. This is also proved by an analysis of the reaction product, especially by the determination of the oxygen content of the coeramidonine formed.

A further proof that only one ring closure takes place in the formation of the coeramidonines from 1,4-arylido-anthraquinone can be seen from the fact that—as I have furthermore found—the same coeramidonine is obtained if the coeramidonines obtained from 4-hydroxy-1-arylido-anthraquinone is reacted with the corresponding aryl amine. Thus, the formation of the coeramidonines from 1,4-ditoluido anthraquinone can be illustrated by the following reaction scheme

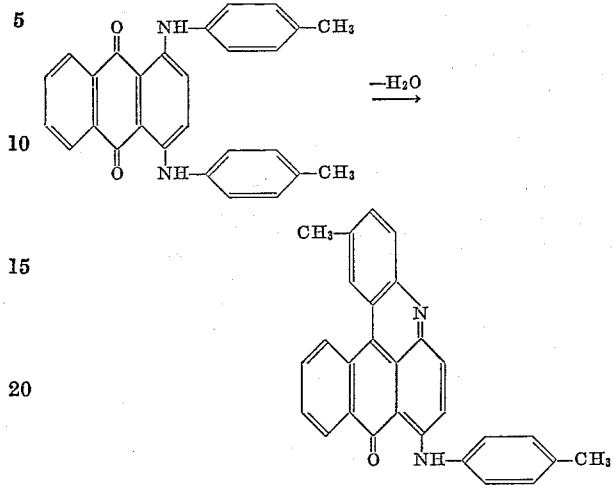

The quaternizing can be carried out by heating a solution or suspension of the coeramidonines in an inert solvent such as chlorobenzene, o-dichlorobenzene or nitrobenzene, with about equimolecular amounts of dimethyl sulfate, to about 80–170° C., preferably 100–150° C. Thereby only mono-quaternary compounds are obtained in this quaternizing reaction. The reaction products frequently separate out in good crystalline form and can be isolated in known manner.

Most surprisingly, the quaternized compounds obtained by the process of the invention are deeper colored—they have a green shade—than the non-quaternized compounds which have a red color. This was especially surprising since coeramidonines from the aforesaid 1-arylido-anthraquinones do not show this shift in color when quaternized. Furthermore it was surprising that the quaternization corresponding to the process of the invention can be carried out only with dimethyl sulfate, while other usually applied quaternation agents, such as diethylsulfate, methyl chloride, benzyl chloride or the methylester of toluene sulfonic acid do not give quaternized compounds.

The products obtained by my invention surprisingly readily dissolve in water although they contain only one water solubilizing group in a comparatively large molecule. The dyestuffs can be used for the dyeing of polymers or copolymers of acrylonitrile from aqueous solutions. The dyeings have an excellent fastness to light.

This application is a continuation-in-part application of my copending application Serial No. 624,736, filed November 28, 1956, and now abandoned.

The following example is given for the purpose of illustrating the invention, the parts being by weight.

*Example*

38 parts of the coeramidonine prepared from 1,4-p-ditoluido-anthraquinone are heated with 250 parts of chlorobenzene to 120° C. and treated at this temperature with 12.5 parts of dimethyl-sulfate within 2 hours. The reaction product slowly separates out in olive-colored crystals. When the reaction is complete, the product is cooled, filtered off by suction, washed with benzene and dried. The mono-quaternary product thus obtained dissolves in water with a green color and dyes polyacrylonitrile fibers in olive-green shades outstandingly fast to light. The dyeing can be carried out as follows:

In a dye bath consisting of 400 ml. of water, 0.15 gram of sodium acetate, 0.1 gram of glacial acetic acid and 0.2 gram of quaternized dyestuff and 10 grams of polyacrylonitrile fibers are dyed for 1 hour at the boil. Thereafter the polyacrylonitrile fibers are rinsed with water.

Similar dyestuffs are obtained if in the above described process are used the coeramidonines obtainable by ring closure from 1,4-dianilido-anthraquinone, 1,4-di-(4'-chloroanilido)-anthraquinone, 1,4-di-(3' - chloro-4'-methylanilido)-anthraquinone and 6 - chloro - 1,4 - di - p - toluido-anthraquinone, whilst the coeramidonine obtained from 5,6-dihydroxy-1,4-ditoluido-anthraquinone yields a dyestuff which dyes polyacrylonitrile fibers in grey shades.

The coeramidonines can be prepared as follows: 76 grams of 1,4-di-p-toluido-anthraquinone are heated in 1 liter of a 70% sulfuric acid to 128–130°. The coeramidonine sulfate formed precipitates in red crystals.

After about 1 hour's reaction time the crystals are isolated and the free coeramidonine is obtained by a treatment with aqueous ammonia.

*Analysis.*—Calculated: C, 84.00%; H, 5.00%; O, 4.00%. Found: C, 83.51%; H, 4.87%; O, 4.18%.

I claim:
1. A compound of the formula

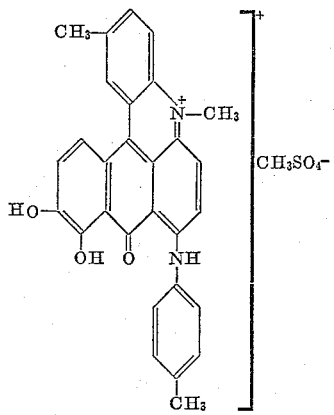

2. A compound of the formula

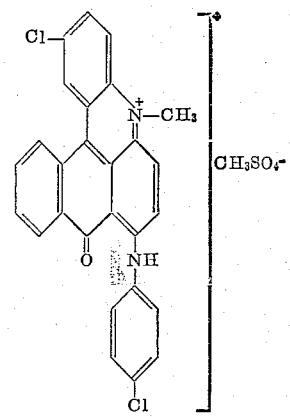

3. A compound of the formula

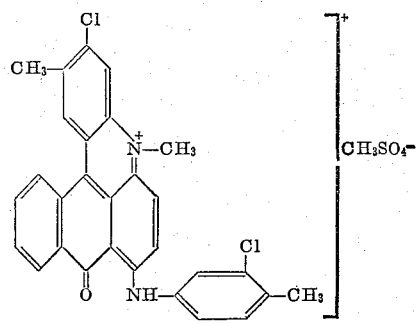

References Cited in the file of this patent

UNITED STATES PATENTS

| | | |
|---|---|---|
| 2,532,437 | Baker | Dec. 5, 1950 |
| 2,598,120 | Griffith | May 27, 1952 |
| 2,615,021 | Randall et al. | Oct. 21, 1952 |
| 2,815,347 | Grelat et al. | Dec. 3, 1957 |

FOREIGN PATENTS

| | | |
|---|---|---|
| 811,464 | France | Apr. 15, 1937 |

OTHER REFERENCES

Houben: Das Anthracen und die Anthrachinone, pages 661–2 (1929).

American Dyestuff Reporter, July 5, 1954, pages 426–37.